No. 817,849. PATENTED APR. 17, 1906.
R. HAND.
PROCESS OF FUMIGATING PLANTS.
APPLICATION FILED JUNE 13, 1904.
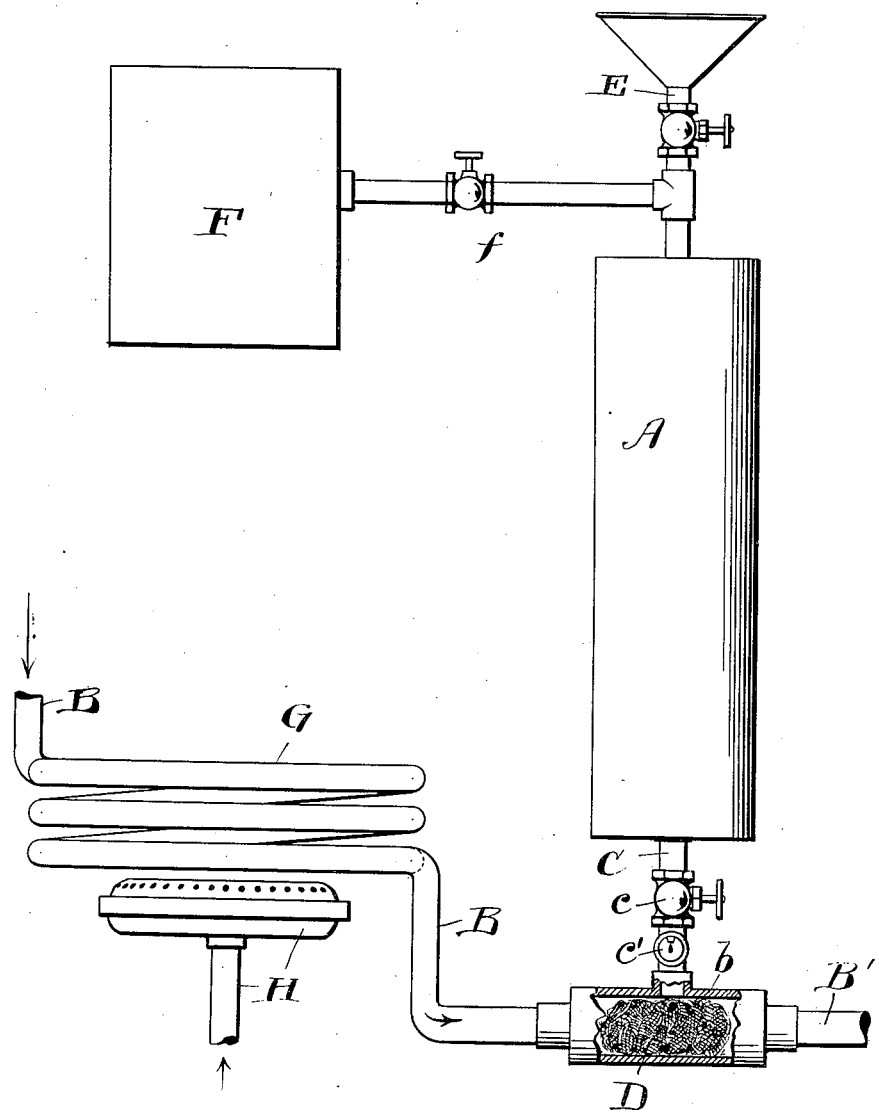

UNITED STATES PATENT OFFICE.

ROBERT HAND, OF EAST CLEVELAND, OHIO.

PROCESS OF FUMIGATING PLANTS.

No. 817,849. Specification of Letters Patent. Patented April 17, 1906.

Application filed June 13, 1904. Serial No. 212,441.

*To all whom it may concern:*

Be it known that I, ROBERT HAND, a citizen of the United States, residing at East Cleveland, in the county of Cuyahoga and State of Ohio, have invented a certain new and useful Improvement in Processes of Fumigating Plants, of which the following is a full, clear, and exact description, reference being had to the accompanying drawings.

The invention is intended, primarily, for use in greenhouses for fumigating plants therein and killing the insects upon them.

The invention is a process which consists, broadly, in exposing a vaporizable liquid insecticide in a finely-subdivided condition to the action of a stream of superheated steam flowing through a suitable conduit, whereby the insecticide is vaporized and carried along with said stream of superheated steam, and in discharging this mixture of superheated steam and insecticide-vapor into the atmosphere which surrounds the plants to be fumigated—that is to say, it is discharged into the greenhouse.

It also consists in the said process coupled with other specific details which render it more practicable, all of which will be hereinafter described, and pointed out definitely in the claims.

The drawing shows an apparatus, partly in section, suitable for the practice of the process.

Referring to the parts by letters, A represents a tank containing vaporizable liquid insecticide—such, for example, as a solution of nicotin.

B represents a steam-pipe which is to be connected with a suitable generator (not shown) and has an enlarged section b, into which the tank A discharges through the pipe C, in which is a valve c. Preferably there is a sight-feed glass c' in this pipe below the valve. In this enlarged section b is placed a crumpled-up mass of fine wire-gauze D or some analogous material, which will cause the liquid insecticide which drops from the pipe C to spread itself out in thin layers, coating the wire.

E represents a valve-controlled supply-pipe having a hopper-shaped upper end, through which the tank may be filled with the liquid insecticide.

F represents a tank of compressed air, which is connected with the pipe E between the valve therein and the tank by a valve-controlled pipe f.

It will be understood, however, that the precise mechanism employed is not essential to the present invention, for any suitable mechanism may be employed in the practice of the novel process.

I have found by experiment that one will have no success if saturated steam be employed, but that the results are exceedingly satisfactory if one uses superheated steam. Therefore the steam is compelled to flow through a superheater, as the coil G, which is heated by a burner H, said superheater being so placed that the steam will be superheated thoroughly before it reaches the insecticide. The degree of superheat imparted to the steam should be only sufficient to enable it to absorb the liquid insecticide and to prevent its condensation in the discharging pipe or pipes B'. At the beginning of a fumigating operation, before the pipes B' become hot, it will be necessary to superheat the steam to a higher degree than will be necessary after said distributing-pipes are heated. It is for this reason that I prefer to employ a burner H, the flame of which may be easily regulated as a means for superheating the steam.

In the practice of the process air under sufficient pressure to cause the flow of the liquid insecticide in tank A into the enlarged part b of the pipe B is placed in the compressed-air tank F and allowed to flow into the tank A. A valve c in the pipe C is opened to a degree which will permit the liquid insecticide to flow substantially as fast as it can be taken up by the superheated steam. This liquid spreads itself in a thin layer over the several wires of the gauze, and as the superheated steam flows through the chamber b and through the wire-gauze the insecticide is vaporized and carried along by the stream of superheated steam into the distributing-pipes B', from which it is discharged into the greenhouse.

Having described my invention, I claim—

1. The herein-described process of fumigating greenhouses, which consists in exposing vaporizable liquid insecticide, in a thin layer, to the action of a stream of superheated steam flowing through a suitable conduit, whereby the insecticide is vaporized and its vapor is taken up and carried along by said superheated steam, and of discharging said superheated steam, laden with the vaporized insecticide, into the atmosphere of the greenhouses, substantially as and for the purpose specified.

2. The herein-described process of fumigating plants contained in a greenhouse, which consists in causing a stream of superheated steam to flow through suitable pipes, and in causing a liquid insecticide to fall slowly into said stream of superheated steam, whereby the insecticide is vaporized and its vapor is taken up and carried along by said stream of superheated steam, and in discharging said superheated steam, laden with the vaporized insecticide, into the atmosphere of the greenhouse, substantially as and for the purpose specified.

3. The herein-described process of fumigating plants which consists in superheating a stream of steam and exposing to the action of said steam an insecticide vaporizable at or below the temperature of the steam, and discharging the resultant vapor into the atmosphere proximate to the plants.

4. The herein-described process of fumigating plants which consists in superheating a stream of steam and interposing in the path of said stream a vaporizable liquid insecticide in a thin layer and directing the vapor resulting therefrom about the plants.

In testimony whereof I hereunto affix my signature in the presence of two witnesses.

ROBERT HAND.

Witnesses:
E. L. THURSTON,
E. B. GILCHRIST.